US007089593B1

(12) United States Patent
Dono et al.

(10) Patent No.: US 7,089,593 B1
(45) Date of Patent: Aug. 8, 2006

(54) METHOD FOR PROVIDING TEMPORARY ACCESS TO A COMMONLY ACCESSIBLE COMPUTER PROCESSING SYSTEM

(75) Inventors: Nicholas R. Dono, Hopewell Junction, NY (US); Bengt-Olaf Schneider, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/387,452

(22) Filed: Sep. 1, 1999

(51) Int. Cl.
*G06F 7/04* (2006.01)
(52) U.S. Cl. .......................................... 726/26; 726/17
(58) Field of Classification Search ........ 713/200–202, 713/185, 186; 705/34, 63; 235/375, 382; 726/2–5, 9, 16, 17–21, 26, 27–28
See application file for complete search history.

(56) References Cited

U.S. PATENT DOCUMENTS

| 4,095,739 A | * | 6/1978 | Fox et al. .................... 235/382 |
| 5,047,928 A | * | 9/1991 | Wiedemer .................... 705/52 |
| 5,600,781 A | | 2/1997 | Root et al. |
| 5,623,637 A | * | 4/1997 | Jones et al. ................. 711/164 |
| 6,349,289 B1 | * | 2/2002 | Peterson et al. .............. 705/34 |

FOREIGN PATENT DOCUMENTS

EP 854421 A1 * 7/1998
JP 07200481 A * 8/1995

OTHER PUBLICATIONS

Microsoft, Microsoft Computer Dictionary, Microsoft Press, 3rd Edition, p. 199.*
Microsoft, Microsoft Computer Dictionary, Microsoft Press, 3rd Edition, 199.*

* cited by examiner

*Primary Examiner*—H. Song
*Assistant Examiner*—Paula Klimach
(74) *Attorney, Agent, or Firm*—F. Chau & Associates LLC (57) ABSTRACT

There is furnished a method for providing an individual temporary access to a commonly accessible computer processing system (CA computer). The CA computer has a plurality of application programs associated therewith. The method includes the step of detecting the coupling of a portable storage device to the CA computer. The storage device has stored therein an access code for indicating whether the user is authorized to temporarily access the CA computer and information including computing preferences of the individual. It is determined whether the individual is authorized to temporarily access the CA computer, based on the access code. The CA computer is modified in accordance with the information stored in the storage device and temporary access is provided to the CA computer, when the individual is authorized to temporarily access the CA computer. The activity of at least one of the individual and the CA computer is monitored, until the storage device is de-coupled from the CA computer. A bill is generated based on the monitoring. The bill is automatically provided to a predetermined billing mechanism.

15 Claims, 6 Drawing Sheets

METHOD FOR PROVIDING TEMPORARY ACCESS TO A COMMONLY ACCESSIBLE COMPUTER PROCESSING SYSTEM

BACKGROUND

1. Technical Field

The present invention relates generally to computer processing systems and, in particular, to a method for providing temporary access to a commonly accessible computer processing system. The method allows a mobile (e.g., traveling) individual to temporarily use a commonly accessible computer other than his or her own desktop or laptop computer and, optionally, application programs on the computer. Moreover, the method allows for the automatic customization of the computer in accordance with the preferences of the computer user. The computer is commonly accessible in that multiple users may be provided temporary access to the computers and the application programs thereon.

2. Background Description

Mobile computing using laptops is a constant compromise between usability, weight, performance, and power consumption. For example, laptop computers generally include less memory than desktop computers. Most laptop computers are predominantly used as desktop replacements, both in offices and while traveling. Current application programs (also referred to herein as "applications") require significant amounts of storage, often several tens of megabytes. Accordingly, depending on the memory size of the storage device contained in the laptop, all the applications may not fit on the storage device. As such, the user may be forced to exclude some or all of the applications from the laptop. This results in the user being unable to use these excluded applications until he or she returns to the "base", desktop system. Accordingly, there is a need for technique that allows a mobile user to obtain access to his or her applications while away from a base system.

Application hosting has been used previously in client-server environments to avoid storing critical or common applications on client computers. Traditionally, server-side installation of applications has been performed to reduce: the cost of application maintenance by keeping a centralized copy of the application files; (2) the amount of client-side storage by installing the bulk of the application files on the server; and (3) the cost of license fees for the application by purchasing a limited number of licenses that can be assigned dynamically to different clients. It is clear that application hosting is predominantly employed to lower expenses for deploying applications throughout an organization. The benefits of application hosting disappear as soon as the user cannot access the server, such as, for example, when the user is traveling. In such situations, the user is prevented from using the application unless there is an alternate way of gaining access to his or her applications. Accordingly, there is a need for a technique that allows a mobile user to obtain temporary access to his or her applications while away from a base station.

Travelling users may be able to obtain access to computers. However, these computers are unlikely to be configured similar to the user's own system. For example, the desktop settings (icons, colors, screen resolution, etc.) will likely be different. This will require the user to be familiar with the new system before he or she is able to work productively. Accordingly, there is a need for a technique that enables the personalization of a computer in accordance with the preferences of a transitory computer user.

U.S. Pat. No. 5,600,781, entitled "Method and Apparatus for Creating Portable Personalized Operating Environment", issued on Feb. 4, 1997, and incorporated herein by reference, discloses the use of Smartcards to personalize application and operating environments. This patent documents the feasibility of quick system personalization based on information carried in a small storage device.

It is evident that it would be highly advantageous to have a method for allowing a mobile computer user to gain temporary access to application programs and to quickly change customizable system features in accordance with the preferences of the user.

SUMMARY OF THE INVENTION

The present invention is directed to a method for providing temporary access to a commonly accessible computer processing system. The present invention allows a mobile computer user to use a computer other than the mobile user's desktop or laptop computers, and to optionally use application programs on the computer. Moreover, the present invention allows the mobile computer user to quickly change customizable system features of the computer in accordance with the preferences of the user.

According to an aspect of the invention, there is furnished a method for providing an individual temporary access to a commonly accessible computer processing system (CA computer). The CA computer has a plurality of application programs associated therewith. The method includes the step of detecting the coupling of a portable storage device to the CA computer. The storage device has stored therein an access code for indicating whether the user is authorized to temporarily access the CA computer and information including computing preferences of the individual. It is determined whether the individual is authorized to temporarily access the CA computer, based on the access code. The CA computer is modified in accordance with the information stored in the storage device and temporary access is provided to the CA computer, when the individual is authorized to temporarily access the CA computer. The activity of at least one of the individual and the CA computer is monitored, until the storage device is de-coupled from the CA computer. A bill is generated based on the monitoring. The bill is automatically provided to a predetermined billing mechanism.

According to another aspect of the invention, there is furnished a method for providing an individual temporary access to a commonly accessible computer processing system (CA computer). The CA computer has a plurality of application programs associated therewith. The method includes the step of generating a user account by coupling to the CA computer a portable storage device available to the individual, and writing an access code to storage device. The access code indicates that the user is authorized to temporarily access the CA computer. The storage device has previously stored therein information including computing preferences of the individual. It is determined whether the individual is authorized to temporarily access the CA computer, based on the access code. The CA computer is modified in accordance with the information stored in the storage device, temporary access is provided to the CA computer, and the activity of at least one of the individual and the CA computer is monitored, when the individual is authorized to temporarily access the CA computer. The monitoring is terminated and a bill is automatically generated based on the monitoring, when the storage device is de-coupled from the CA computer. The bill is automatically provided to a predetermined billing mechanism.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method for providing temporary access to a commonly accessible computer processing system (hereinafter "CA computer"). The CA computer is commonly accessible in that multiple users may be provided temporary access to the CA computer and the application programs thereon. According to the method, the user of the CA computer has a portable storage device available (e.g., on his or her person) for interfacing with the CA computer.

The present invention allows an individual to use a computer (i.e., the CA computer) other than the user's desktop or laptop computers, and to optionally use application programs on the computer. Moreover, the present invention allows the individual to quickly change customizable system features of the CA computer in accordance with his or her preferences. Such authorizations and customizations are automatically achieved through the use of the portable storage device.

To facilitate a clear understanding of the present invention, definitions of terms employed herein will now be given. System software refers to control software that provides the basic services to a user like reading/writing files, displaying data on the screen, and interfacing with different hardware components of the underlying hardware. Operating systems such as, for example, WINDOWS98 or UNIX, and middleware components, such as, for example, web-browsers or object-brokers, are examples of system software. System software typically is specific to the underlying hardware.

Applications (or programs or application programs) refer to software programs that rely on the services provided by the system software to perform a task for the user. Typical application programs include word processors, spreadsheets, calendars, computer aided design (CAD) programs, and so forth. Application programs are normally specific to a particular system software.

User data refers to data created by the user through the use of application programs. Typically, such data is stored in a format specific to the application that was used to create the data. Changes to the user data therefore require the availability of the creating application.

Personalization settings refer to the numerous settings provided in both system software and applications that allow the user to make changes to adapt the software to his or her needs or preferences. For example, an operating system like WINDOWS98 allows for the selection and placement of icons corresponding to frequently used applications and data onto the desktop surface. Another example of personalization with respect to application programs is a software switch that allows the automatic spell checker in a word processor to be turned on or off. Further examples include: the desktop settings, such as, for example, color scheme, font size, desktop pattern and screen saver; the setting of application options, such as, for example, preferred directories or default font size; user-specific tables like address books or bookmarks; and so forth.

Portable storage device refers to a physical device that provides permanent storage and that can be removed easily from the CA computer. Examples of such devices are diskettes, flash memory cards for use in a PCMCIA slot, removable hard-drives like the IBM MICRODRIVE or the IOMEGA JAZZ cartridges, and so forth. However, the present invention is not limited to the above recited examples and, thus, other types of portable storage devices may be used, including those which communicate by infrared and/or radio frequency.

Primary computer processing system (or primary computer) refers to the user's own computer. For the user, access to this computer is unrestricted and he or she has privileges to add, remove or change applications and data at will.

Commonly accessible computer processing system ("CA computer") refers to a computer used temporarily to access data while away from the primary computer. The user typically does not have unrestricted access to this computer and does not have full privileges for access to all resources of this computer.

It is to be understood that the present invention may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed.

Figure 1:
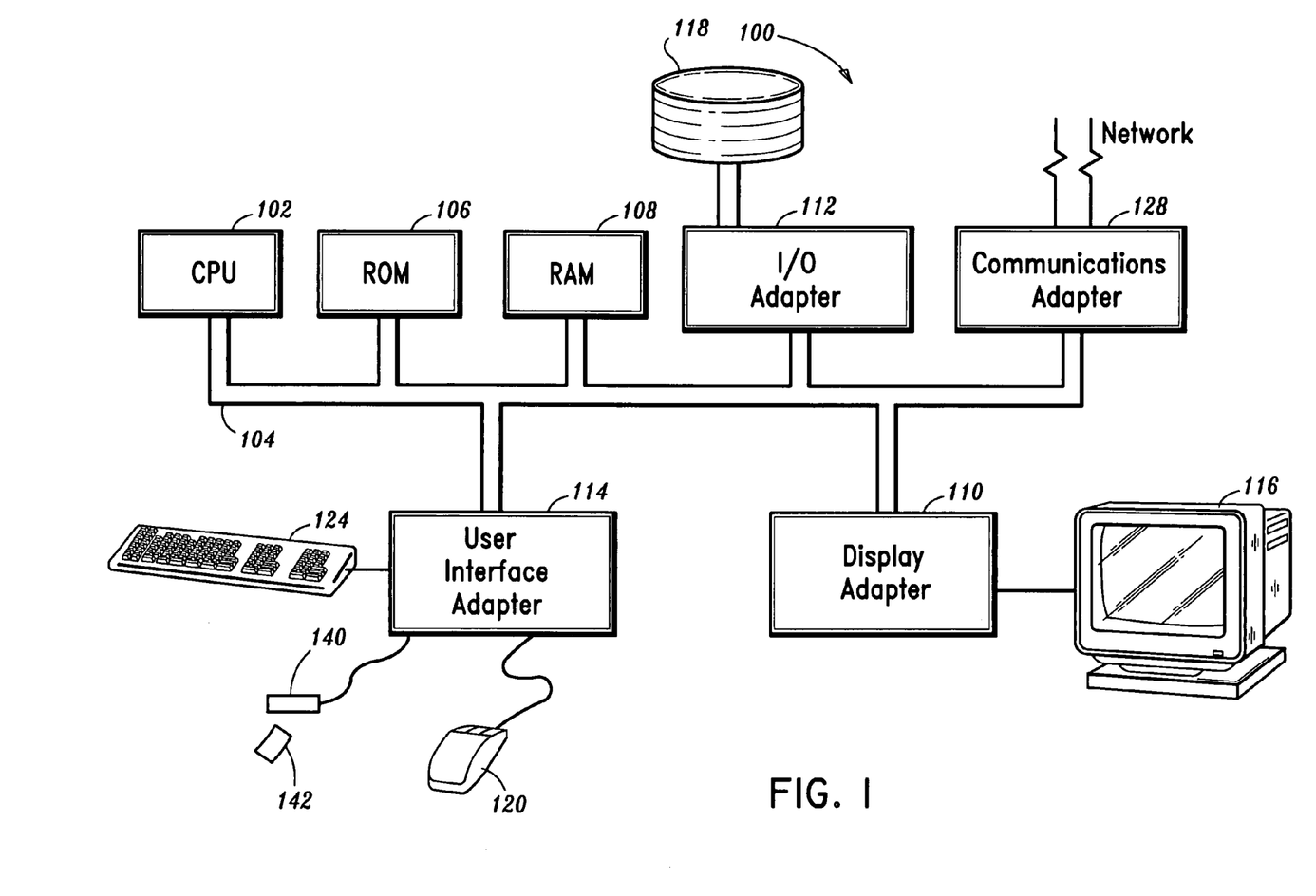
FIG. 1 is a block diagram of a computer processing system to which the present invention may be applied according to an embodiment of the present invention.

FIG. 1 is a block diagram of a computer processing system (CA computer) 100 to which the present invention may be applied according to an embodiment of the present invention. The CA computer 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a communications adapter 128 are operatively coupled to system bus 104.

A display device 116 is operatively coupled to system bus 104 by display adapter 110. A disk storage device (e.g., a magnetic or optical disk storage device) 118 is operatively couple to system bus 104 by I/O adapter 112.

A mouse 120 and keyboard 124 are operatively coupled to system bus 104 by user interface adapter 114. The mouse and keyboard may be used to input and output information to and from the CA computer 100. An interface device 140 is also operatively coupled to system bus 104 by user interface adapter 114. The interface device 140 allows the CA computer to interface with a portable storage device 142, described more fully hereinbelow. In a preferred embodiment of the present invention, the portable storage device 142 is a PCMCIA card and the interface device 140 is a PCMCIA reader.

The CA computer 100 may communicate with another computer(s) through communications adapter 128. The other computer(s) may be part of an intranet or the Internet.

A general description of the present invention will now be provided to introduce the reader to the concepts of the invention. Subsequently, more detailed descriptions of various aspects of the invention will be provided.

The present invention is directed to a method for providing temporary access to a commonly accessible computer, the CA computer user having a storage device on his or her person for interfacing with the CA computer. The method may be used by entities such as, for example, hotels internet cafes. The CA computer users may be, for example, individuals traveling on business or those desiring to "chat" in an internet chat room. The storage device may be, for example, a SMARTCARD, COMPACTFLASH, small disk drive, and so forth. The storage device includes pertinent information about the user.

The user can access the commonly accessible computer by inserting his or her portable storage device into a matching interface. The business reads the user information stored in the portable storage device and authorizes the user to access the CA computer. This will change the personalization settings on the CA computer to match the information on the user's storage device.

The CA computer may run application programs stored on the portable storage device. Additionally or alternatively, the entities may provide authorization to use one or more applications available on the CA computer.

Fees are automatically incurred as the user runs applications provided on the CA computer. Upon completion, the user removes his storage device from the CA computer. This will automatically remove the user information and data from that CA computer and initiate a billing process that charges the user's account for the services.

Figure 2:
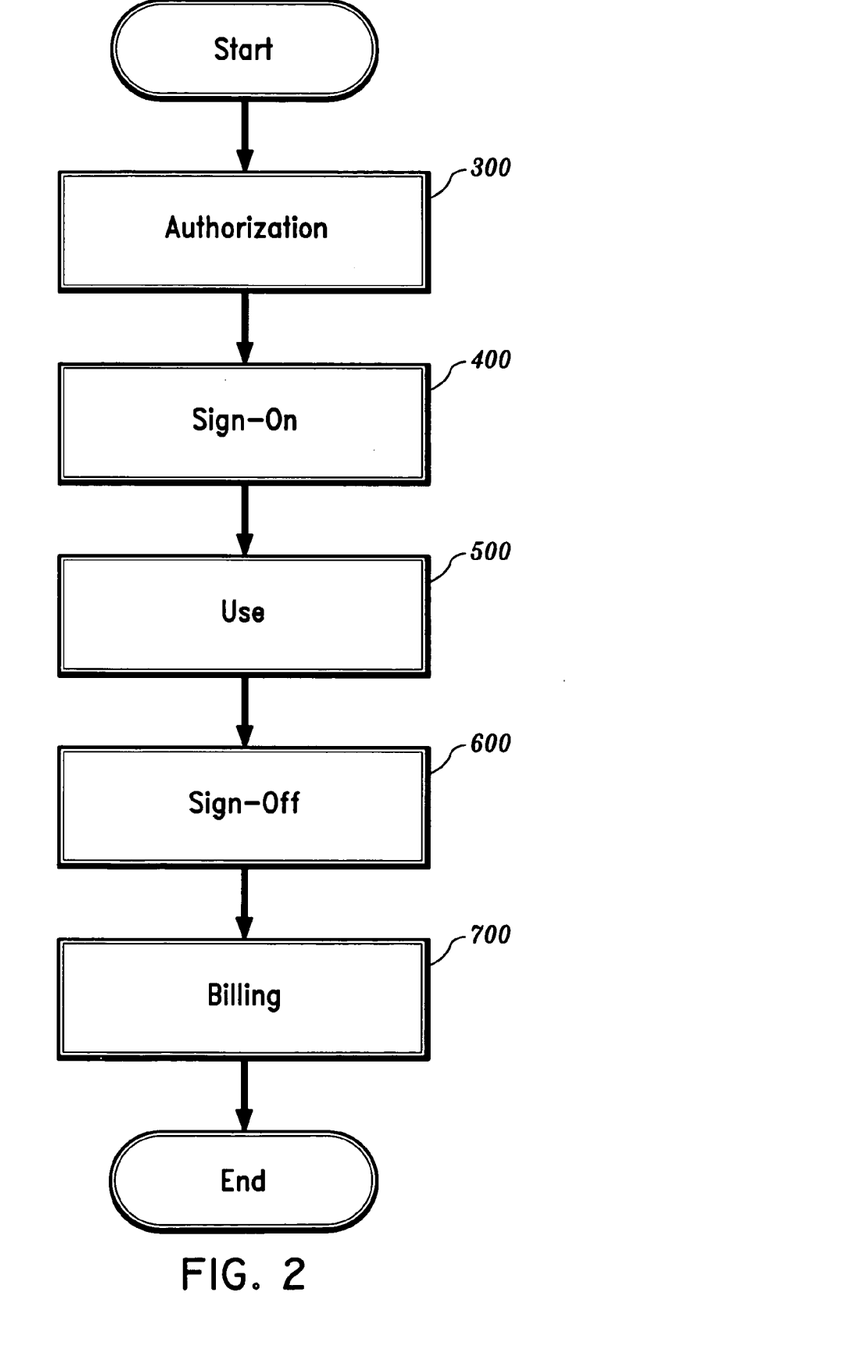
FIG. 2 is a flow diagram illustrating the phases of a method for providing temporary access to a commonly accessible computer processing system (CA computer) according to an embodiment of the present invention.

FIG. 2 is a flow diagram illustrating the phases of a method for providing temporary access to a commonly accessible computer processing system (CA computer) according to an embodiment of the present invention. The method is divided into the following phases: authorization 300; sign-on 400; use 500; sign-off 600; and billing 700.

During the authorization phase 300, the user is granted access to the CA computer 100 and provided with a user account on the CA computer 100. Access is granted by storing an encrypted access code on the user's portable storage device 142. The user account is used to record the user activity during the Use phase. These records form the basis of the billing phase.

Figure 3:
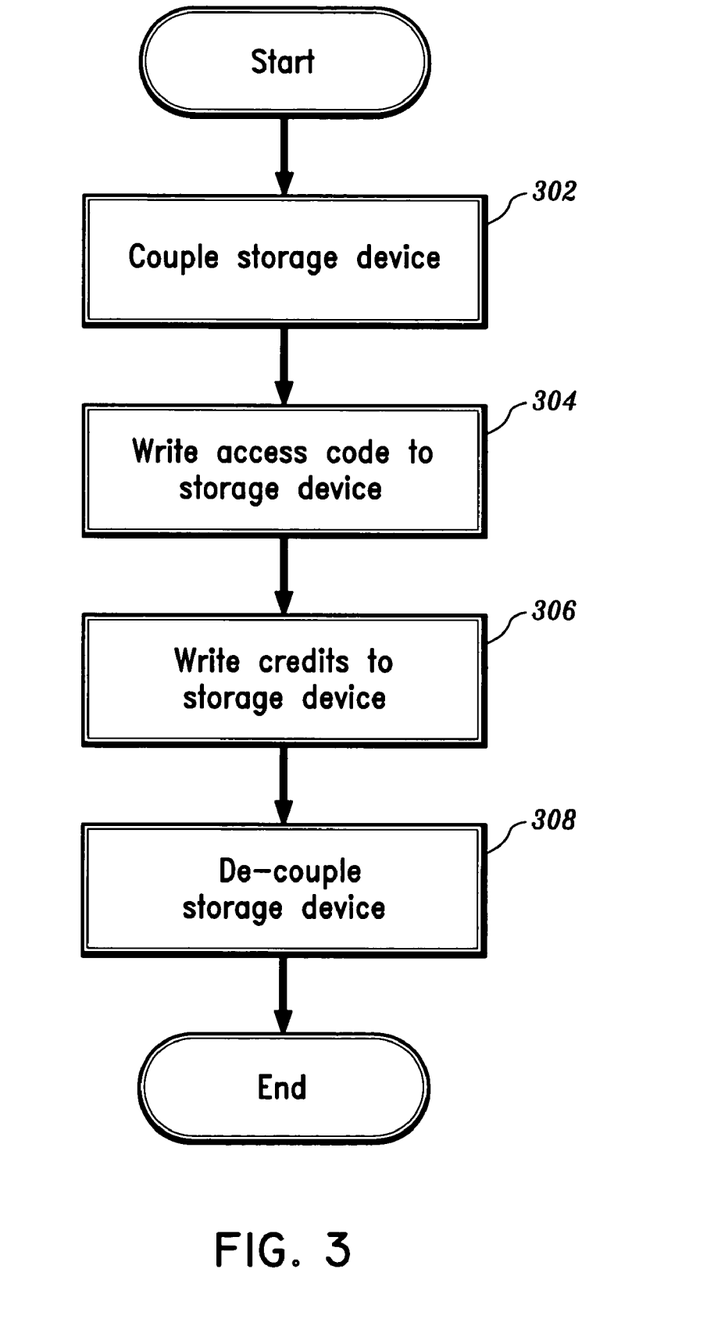
FIG. 3 is a flow diagram illustrating the steps performed during an authorization phase of the method for providing temporary access to a commonly accessible computer processing system according to an embodiment of the present invention.

FIG. 3 is a flow diagram illustrating the steps performed during the authorization phase 300 of the method for providing temporary access to a commonly accessible computer processing system according to an embodiment of the present invention. The portable storage device 142 is coupled to an interface device 140 that can access and modify the contents of the portable storage device 142 (step 302). Then, a user-specific access code is written to the portable storage device 142 that authorizes the use of various services, including entry to a set of rooms, billing of meals, access to the common computer, and so forth (step 304). Depending on the agreement between the service provider and the user, the access code may only grant access to certain services. Optionally, prepaid usage credits are stored on the portable storage device 142 (step 306). In an alternative embodiment, these usage credits may be stored on a central server (not shown) instead of the portable storage device 142. After completion of the authorization step, the portable storage device 142 is de-coupled from the interface device 140 (step 308).

Figure 4:
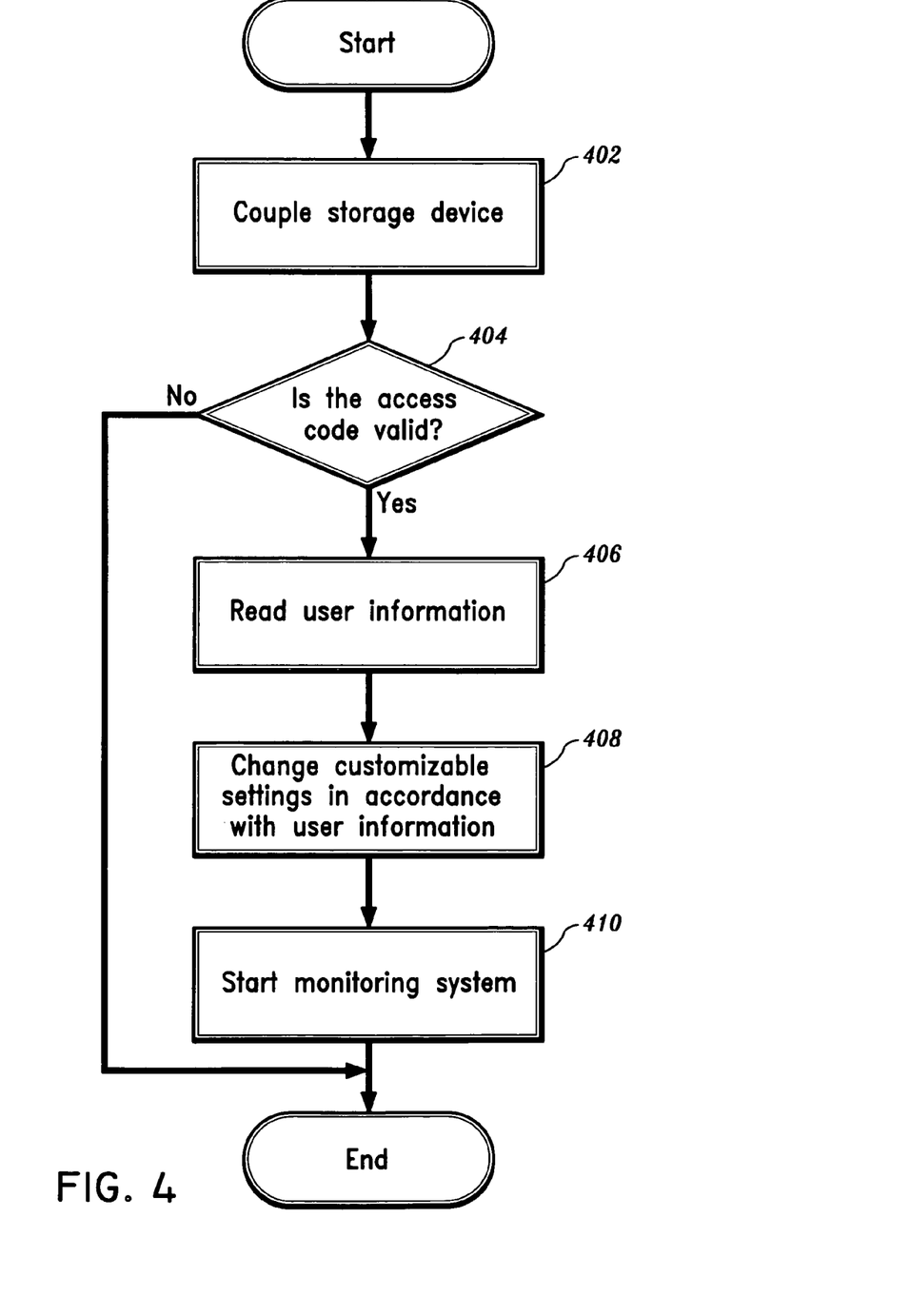
FIG. 4 is a flow diagram illustrating the steps performed during a sign-on phase of the method for providing temporary access to a commonly accessible computer processing system according to an embodiment of the present invention.

FIG. 4 is a flow diagram illustrating the steps performed during the sign-on phase 400 of the method for providing temporary access to a commonly accessible computer processing system according to an embodiment of the present invention. The sign-on phase 400 is initiated when the user couples the portable storage device 142 to the CA computer 100 (step 402). This connection is detected automatically. The user authorization is then checked/verified by inspecting the authorization code that was stored on the portable storage device 142 in step 304 (step 404). Then, the user's personalization information is read from the portable storage device 142 (step 406) and the customizable system and application settings are changed in accordance with the user's preferences (step 408). At the end of the sign-on phase 400, an automatic monitoring system is started on the CA computer 100 that tracks user activity (step 410).

Figure 5:
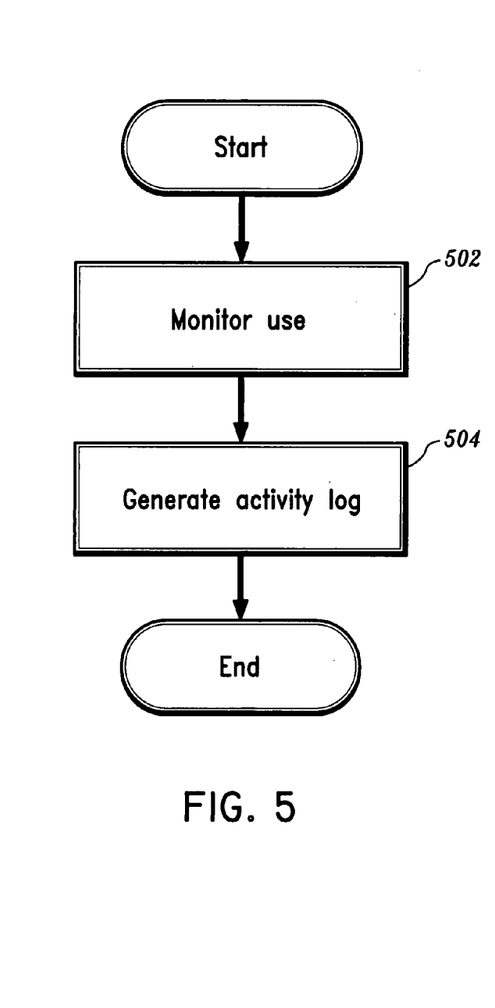
FIG. 5 is a flow diagram illustrating the steps performed during a use phase of the method for providing temporary access to a commonly accessible computer processing system according to an embodiment of the present invention.

FIG. 5 is a flow diagram illustrating the steps performed during the use phase 500 of the method for providing temporary access to a commonly accessible computer processing system according to an embodiment of the present invention. During the use phase 500, the user works with the CA computer 100 as if it were his primary computer. The user's use of the CA computer 100 is monitored (e.g., by monitoring the user's and/or the computer's activity) (step 502), and an activity log is generated based on such monitoring (step 504). The user can use applications present on the CA computer 100 and/or applications that are resident on the portable storage device 142. If billing occurs by user activity, several existing methods, as well as other methods, may be used to monitor the user's actions. For instance, some operating systems (like Windows NT) have built-in auditing capabilities that can generate reports on how often and how intensely a computer was used over a certain period of time. Alternatively, a privileged application may be installed on the CA computer 100 to periodically sample and record the active processes together with their consumption of CPU time. This information may be used to determine the amount the user is to be billed.

Figure 6:
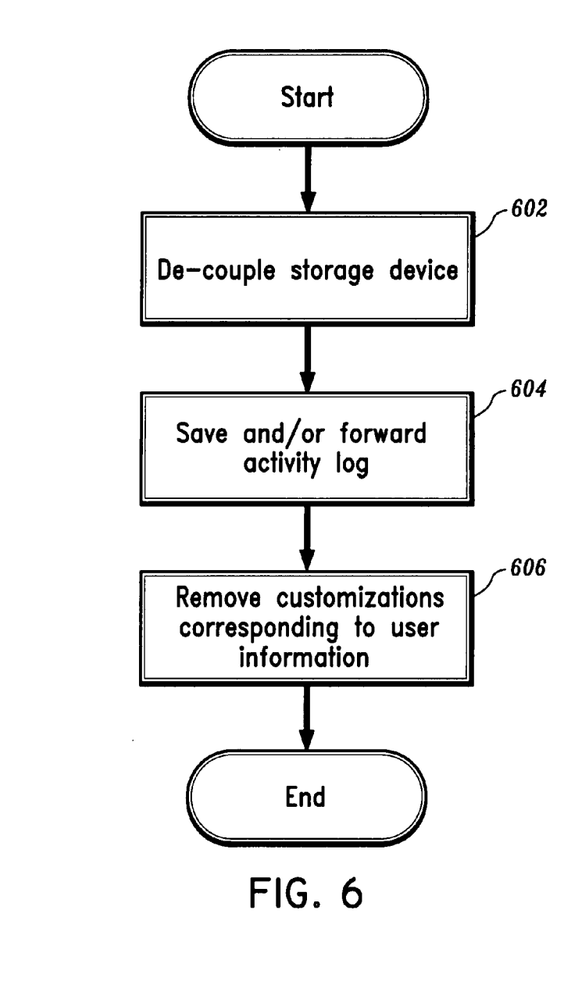
FIG. 6 is a flow diagram illustrating the steps performed during a sign-off phase of the method for providing temporary access to a commonly accessible computer processing system according to an embodiment of the present invention.

FIG. 6 is a flow diagram illustrating the steps performed during the sign-off phase 600 of the method for providing temporary access to a commonly accessible computer processing system according to an embodiment of the present invention. Once the user has completed his work on the CA computer 100, he or she disconnects the portable storage device 142 (step 602). This initiates the sign-off phase 600. During sign-off, the system saves and/or forwards the user activity log for processing (step 604). At the end of the sign-off phase 600, all personalization information introduced during the sign-on phase 300 is removed and the system returns to its default configuration (step 606).

Figure 7:
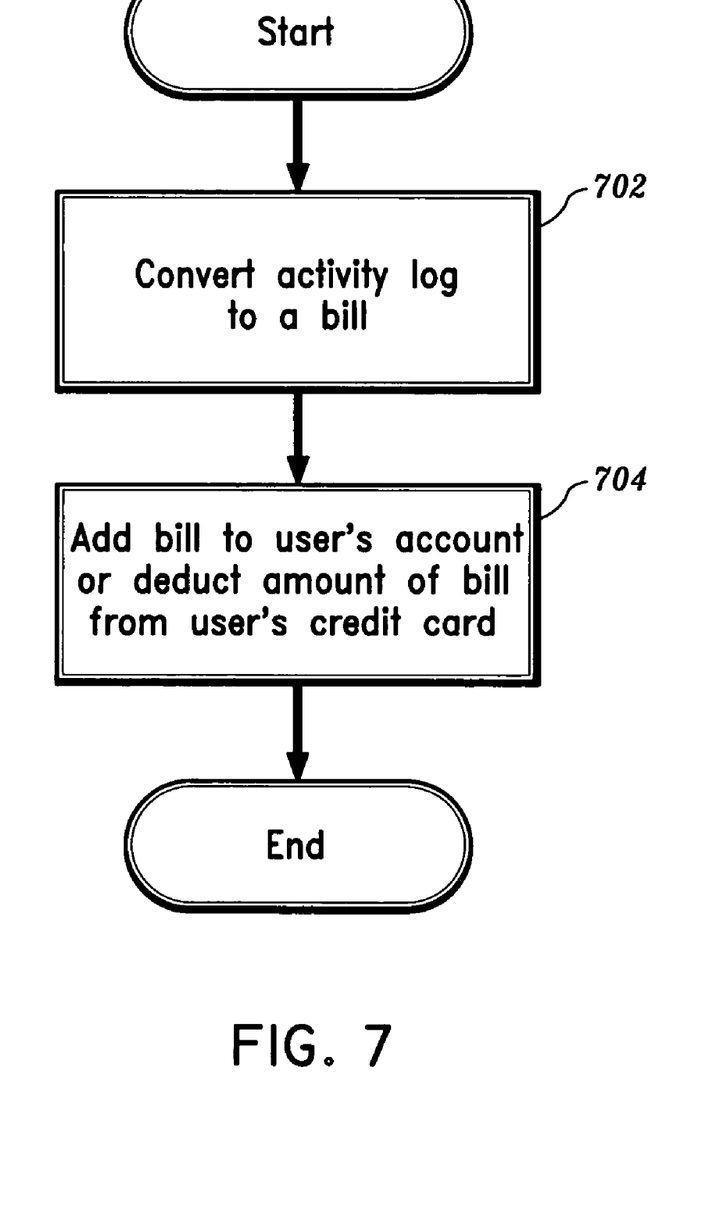
FIG. 7 is a flow diagram illustrating the steps performed during a billing phase of the method for providing temporary access to a commonly accessible computer processing system according to an embodiment of the present invention.

FIG. 7 is a flow diagram illustrating the steps performed during the billing phase 700 of the method for providing temporary access to a commonly accessible computer processing system according to an embodiment of the present invention. In the billing phase 700, the log is converted to a bill for the services incurred according to cost schedule (step 702). Different such schedules are conceivable, such as, for example, billing for total time signed-on to the CA computer 100 or billing for time spent running applications stored on the CA computer 100. The final amount will be automatically posted to the user's account or deducted from his credit card (step 704). It is to be appreciated that other predetermined billing mechanisms may also be used other than the user's account or credit card. Since the billing phase 700 can be performed based solely on information created on the CA computer 100, there is no need to interact again with a customer representative or a service center.

The above described method applies equally to installations where the user interacts directly with the CA computer 100, e.g. a PC, or via a remote interface like the X-Windows protocol or Citrix Windows Terminal. In any case, the user-interface is similar to the one on the primary computer.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for providing an individual temporary access to a commonly accessible computer processing system (CA computer), the CA computer having a plurality of application programs associated therewith, the method comprising the steps of:
   detecting a coupling of a portable storage device to the CA computer, the storage device having stored therein an access code for indicating whether an individual is authorized to temporarily access the CA computer and information comprising computing preferences of the individual;
   determining whether the individual is authorized to temporarily access the CA computer, based on the access code;
   modifying the CA computer in accordance with the information stored in the storage device and providing temporary access to the CA computer, when the individual is authorized to temporarily access the CA computer;
   monitoring activity of at least one of the individual and the CA computer, until the storage device is de-coupled from the CA computer;
   generating a bill based on said monitoring; and
   automatically providing the bill to a predetermined billing mechanism;
   determining whether the individual is authorized to temporarily use any of the plurality of application programs associated with the CA computer, based on the access code; and
   providing temporary access to the application programs associated with the CA computer for which authorization is indicated; when the individual is authorized to temporarily use any of the plurality of application programs associated with the CA computer.

2. The method according to claim 1, wherein said step of generating the bill comprises the steps of:
   generating an activity log based on said monitoring; and
   converting the activity log into the bill.

3. The method according to claim 1, further comprising the step of inhibiting temporary access to the CA computer, when the individual is not authorized to access the CA computer.

4. The method according to claim 1, wherein the portable storage device comprises a PCMCIA card.

5. The method according to claim 1, wherein the PCMCIA card comprises a flash memory card.

6. The method according to claim 1, wherein the predetermined billing mechanism is associated with one of a user account and a credit card.

7. The method according to claim 1, wherein the portable storage device further stores therein application programs associated with the individual, and said step of providing temporary access to the CA computer further comprises the step providing temporary access to the application programs stored in the portable storage device for execution by the CA computer.

8. The method according to claim 1, further comprising the step of providing the individual with a user account by writing the access code to the portable storage device, before said step of determining whether the individual is authorized to temporarily access the CA computer.

9. A method for providing an individual temporary access to a commonly accessible computer processing system (CA computer), the CA computer having a plurality of application programs associated therewith, the method comprising the steps of:
   generating a user account by coupling to the CA computer a portable storage device available to an individual, and writing an access code to storage device, the access code indicating that the individual is authorized to temporarily access the CA computer, the storage device having previously stored therein information comprising computing preferences of the individual;
   determining whether the individual is authorized to temporarily access the CA computer, based on the access code;
   modifying the CA computer in accordance with the information stored in the storage device, providing temporary access to the CA computer, and monitoring activity of
   at least one of the individual and the CA computer, when the individual is authorized to temporarily access the CA computer;

terminating said monitoring and automatically generating a bill based on said monitoring, when the storage device is decoupled from the CA-computer; and automatically providing the bill to a predetermined billing mechanism;

determining whether the individual is authorized to temporarily use any of the plurality of application programs associated with the CA computer, based on the access code; and providing temporary access to the application programs associated with the CA computer for which authorization is indicated, when the individual is authorized to temporarily use any of the plurality of application programs associated with the CA computer.

10. The method according to claim 9, further comprising the step of inhibiting temporary access to the CA computer, when the individual is not authorized to access the CA computer.

11. The method according to claim 9, wherein the portable storage device further stores therein application programs associated with the individual, and said step of providing temporary access to the CA computer further comprises the step providing temporary access to the application programs stored in the portable storage device for execution by the CA computer.

12. A program storage device readable by machine, tangibly embodying a program of instructions executable by the machine to perform method steps for providing an individual temporary access to a commonly accessible computer processing system (CA computer), the CA computer having a plurality of application programs associated therewith, said method steps comprising:

automatically detecting a coupling of a portable storage device to the CA computer, the storage device having stored therein an access code for indicating whether an individual is authorized to temporarily access the CA computer and information comprising computing preferences of the individual;

automatically determining whether the individual is authorized to temporarily access the CA computer, based on the access code;

automatically modifying the CA computer in accordance with the information stored in the storage device and providing temporary access to the CA computer, when the individual is authorized to temporarily access the CA computer;

automatically monitoring activity of at least one of the individual and the CA computer, until the storage device is de-coupled from the CA computer;

automatically generating a bill based on said monitoring; and automatically providing the bill to a predetermined billing mechanism;

determining whether the individual is authorized to temporarily use any of the plurality of application programs associated with the CA computer, based on the access code; and providing temporary access to the application programs associated with the CA computer for which authorization is indicated, when the individual is authorized to temporarily use any of the plurality of application programs associated with the CA computer.

13. The program storage device according to claim 12, wherein said step of generating the bill comprises the steps of:

generating an activity log based on said monitoring; and
converting the activity log into the bill.

14. The program storage device according to claim 12, further comprising the step of inhibiting temporary access to the CA computer, when the individual is not authorized to access the CA computer.

15. The program storage device according to claim 12, wherein the predetermined billing mechanism is associated with one of a user account and a credit card.

* * * * *